(No Model.)
J. MASON.
KNIFE.
No. 437,762. Patented Oct. 7, 1890.
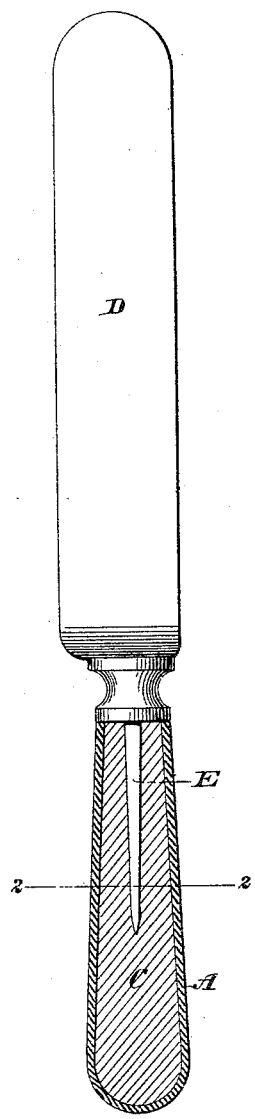
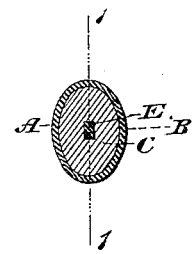
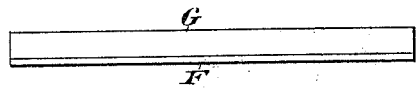
WITNESSES:
Gustave Dieterich
C. Aug. Dieterich
INVENTOR
John Mason,
BY
Chas. C. Gill
ATTORNEY.

UNITED STATES PATENT OFFICE.

JOHN MASON, OF NEW YORK, N. Y.

KNIFE.

SPECIFICATION forming part of Letters Patent No. 437,762, dated October 7, 1890.

Application filed July 11, 1890. Serial No. 358,439. (No model.)

*To all whom it may concern:*

Be it known that I, JOHN MASON, a citizen of the United States, and a resident of New York, in the county of New York and State of New York, have invented certain new and useful Improvements in Handles for Table-Cutlery, of which the following is a specification.

The invention relates to improvements in handles for table-cutlery, and particularly in handles for knives; and it consists, essentially, in a handle composed of an exterior shell and a solid filling of aluminum.

The object of my invention is to produce a handle of special characteristics and possessing marked advantages over the handles heretofore manufactured.

In accordance with my invention I produce a handle which is lighter and stronger than those heretofore known, and one which will not be affected by water nor become indented under ordinary circumstances.

The handle produced in accordance with my invention will unite firmly with the tine on the knife-blade, and will not permit the latter to work loose or become detached, and the handle and blade when secured together form an article whose weight is conveniently distributed, and which is durable, inexpensive of manufacture, and desirable in many particulars.

In carrying my invention into effect I stamp or strike up the shell of the handle in two halves, and then unite these with the filling of aluminum between them, after which, at the proper time, the filling is bored into through the open-shank end of the handle preparatory to the introduction of the tine on the end of the knife-blade and the completion of the article.

The accompanying drawings illustrate the invention, Figure 1 being a central longitudinal section of the handle with the blade in position; Fig. 2, a transverse section of same; Fig. 3, a detached perspective view of one of the halves of the handle with the filling omitted, and Fig. 4 an edge view of the sheet metal for the shell with the layer of aluminum upon it ready to be struck up into the half-shell having an aluminum filling.

In the drawings, A B designate the two halves of the handle, C the filling of aluminum, and D the blade, whose tine E is held within said filling.

In Fig. 4, F denotes the sheet of metal used for the half-shells A B, and G the layer of aluminum placed on said sheet F and struck up with it, so that the half-shell when formed will contain the aluminum filling, the latter completely filling the shell and being uniform throughout. The two half-shells when completed with the filling will be properly burnished, and then united by solder or otherwise to form the complete handle.

I do not confine myself to the exact details of construction presented in the drawings, since these may be modified, if desired, without departing from the scope of the invention.

What I claim as my invention, and desire to secure to by Letters Patent, is—

The handle for table-cutlery, consisting of the external shell and a filling of aluminum, substantially as set forth.

Signed at New York, in the county of New York and State of New York, this 10th day of July, A. D. 1890.

JOHN MASON.

Witnesses:
 CHAS. C. GILL,
 E. D. MILLER.